United States Patent
Butcher et al.

(10) Patent No.: US 10,560,527 B2
(45) Date of Patent: Feb. 11, 2020

(54) NETWORK SERVICE CHAINS USING HARDWARE LOGIC DEVICES IN AN INFORMATION HANDLING SYSTEM

(71) Applicant: DELL PRODUCTS, L.P., Round Rock, TX (US)

(72) Inventors: Wade A. Butcher, Cedar Park, TX (US); Rich M. Hernandez, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 135 days.

(21) Appl. No.: 15/447,319

(22) Filed: Mar. 2, 2017

(65) Prior Publication Data

US 2018/0255157 A1    Sep. 6, 2018

(51) Int. Cl.
*H04L 29/08*    (2006.01)
*G06F 13/28*    (2006.01)
*G06F 13/40*    (2006.01)

(52) U.S. Cl.
CPC .......... *H04L 67/1097* (2013.01); *G06F 13/28* (2013.01); *G06F 13/4068* (2013.01); *H04L 67/104* (2013.01); *H04L 67/1008* (2013.01); *H04L 67/34* (2013.01)

(58) Field of Classification Search
CPC ....... H04L 67/16; H04L 67/42; H04L 43/028; G06F 9/46; G06F 9/45558
USPC ..... 709/204, 212, 203; 710/10, 22, 268, 315
See application file for complete search history.

(56) References Cited

U.S. PATENT DOCUMENTS

| | | | | |
|---|---|---|---|---|
| 7,191,255 B2* | 3/2007 | Wong | .................... | G06F 13/423 710/15 |
| 7,302,512 B1* | 11/2007 | Currid | ....................... | G06F 9/46 710/260 |
| 7,571,273 B2* | 8/2009 | Boyd | .................... | G06F 13/385 710/306 |
| 7,747,809 B2* | 6/2010 | Hanscom | ............ | G06F 11/0745 710/309 |
| 7,991,839 B2* | 8/2011 | Freimuth | ................ | G06F 13/28 379/88.02 |
| 8,214,505 B2* | 7/2012 | Jagadeeswaran | ....... | H04L 67/02 709/203 |

(Continued)

OTHER PUBLICATIONS

Mohammed AA, Gharbaoui M, Martini B, Paganelli F, Castoldi P. SDN controller for network-aware adaptive orchestration in dynamic service chaining. In2016 IEEE NetSoft Conference and Workshops (NetSoft) Jun. 6, 2016 (pp. 126-130). IEEE. (Year: 2016).*

(Continued)

*Primary Examiner* — James N Fiorillo
(74) *Attorney, Agent, or Firm* — Isidore PLLC (57) ABSTRACT

A method, an information handling system (IHS), an IHS and a network interface system for transmitting data in an IHS. The method includes detecting, via a network interface device controller of a first IHS, a first memory transaction request from a second IHS to a first system memory of the first IHS. A plurality of first data associated with the first memory transaction request is received. A first peer to peer message is transmitted to a hardware logic device (HLD). The first peer to peer message includes a first action for the HLD. The HLD is triggered to process the first data according to the first action such that the HLD generates a plurality of second data.

16 Claims, 7 Drawing Sheets

(56) References Cited

U.S. PATENT DOCUMENTS

| | | | |
|---|---|---|---|
| 8,566,389 B2* | 10/2013 | Orady | G06F 3/14 709/203 |
| 9,047,208 B1* | 6/2015 | Moore | G06F 9/45533 |
| 2006/0090014 A1* | 4/2006 | Wong | G06F 13/423 710/10 |
| 2006/0242332 A1* | 10/2006 | Johnsen | G06F 13/28 710/22 |
| 2008/0137677 A1* | 6/2008 | Boyd | G06F 13/385 370/419 |
| 2008/0147904 A1* | 6/2008 | Freimuth | G06F 13/28 710/22 |
| 2009/0210607 A1* | 8/2009 | Hanscom | G06F 11/0745 710/315 |
| 2013/0054726 A1* | 2/2013 | Bugge | G06F 9/52 709/212 |
| 2014/0181232 A1* | 6/2014 | Manula | G06F 9/546 709/213 |
| 2014/0280547 A1* | 9/2014 | DeCusatis | H04L 67/34 709/204 |
| 2015/0341466 A1* | 11/2015 | Sah | G06F 16/2471 707/770 |
| 2016/0050261 A1* | 2/2016 | McDaid | H04L 67/10 709/204 |
| 2016/0103783 A1* | 4/2016 | Allen | H04L 12/6418 709/212 |
| 2016/0134531 A1 | 5/2016 | Assarpour et al. | |
| 2016/0188527 A1* | 6/2016 | Cherian | G06F 15/167 709/212 |
| 2016/0285764 A1 | 9/2016 | Yang et al. | |
| 2016/0337272 A1* | 11/2016 | Berman | H04L 49/70 |
| 2016/0352578 A1 | 12/2016 | Chen et al. | |
| 2017/0017609 A1* | 1/2017 | Menachem | G06F 15/17331 |
| 2017/0034050 A1 | 2/2017 | Sunavala et al. | |
| 2017/0123835 A1* | 5/2017 | Mizuno | G06F 9/544 |
| 2017/0168985 A1* | 6/2017 | Hwang | H04L 67/42 |
| 2017/0168986 A1* | 6/2017 | Sajeepa | G06F 15/17331 |
| 2017/0171075 A1* | 6/2017 | Sajeepa | H04L 45/745 |
| 2018/0139134 A1* | 5/2018 | Gong | H04L 67/1097 |
| 2018/0239725 A1* | 8/2018 | Kumar | G06F 13/28 |
| 2018/0241842 A1* | 8/2018 | Kumar | H04L 67/322 |

OTHER PUBLICATIONS

Mohammed AA, Gharbaoui M, Martini B, Paganelli F, Castoldi P. SDN controller for network-aware adaptive orchestration in dynamic service chaining. In2016 IEEE NetSoft Conference and Workshops (NetSoft) Jun. 6, 2016 (pp. 126-130). IEEE. (Year: 2016 ) (Year: 2016).*

* cited by examiner

NETWORK SERVICE CHAINS USING HARDWARE LOGIC DEVICES IN AN INFORMATION HANDLING SYSTEM

BACKGROUND

1. Technical Field

The present disclosure generally relates to information handling systems and in particular to network service chains using hardware logic devices in an information handling system.

2. Description of the Related Art

As the value and use of information continue to increase, individuals and businesses seek additional ways to process and store information. One option available to users is information handling systems (IHS). An information handling system generally processes, compiles, stores, and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One use of IHSs is with network service chains. Network service chaining is a capability that uses software-defined networking (SDN) capabilities within IHSs to create a service chain of connected network services and connect them in a virtual chain. This capability can be used by network operators to set up connected services with different characteristics. SDN separates a network's control plane and forwarding planes, enabling the network control to become directly programmable and the underlying infrastructure to be abstracted for applications and network services. SDN enables cloud and network engineers and administrators to respond quickly to changing business requirements via centralized control. SDN encompasses multiple kinds of network technologies designed to make the network more flexible and agile to support virtualized server and storage infrastructure of modern data centers. It is difficult in a large cloud computing system to efficiently distribute the workload and computing functions among the various computing systems. Some parts of the cloud computing system can become overloaded, while other parts have unused capacity.

BRIEF SUMMARY

Disclosed are a method, an information handling system (IHS), and a network interface system for transmitting data in an IHS using remote direct memory access.

According to one embodiment, a method of transmitting data in an IHS is disclosed. The method includes detecting, via a network interface device controller of a first IHS, a first memory transaction request sent from a second IHS to a first system memory of the first IHS. A plurality of first data associated with the first memory transaction request is received. A first peer to peer message is transmitted to a hardware logic device (HLD). The first peer to peer message includes a first action for the HLD. The method includes triggering the HLD to process the first data according to the first action such that the HLD generates a plurality of second data.

Also disclosed is an IHS that includes (i) a processor that is communicatively coupled to a first system memory, (ii) a HLD that is communicatively coupled to the first system memory and (iii) a first network interface device that is communicatively coupled to the processor, the first system memory, and the HLD. The first network interface device includes a first controller that has firmware executing thereon that causes the first controller to detect a first memory transaction request sent from a second IHS to the first system memory and to receive a plurality of first data associated with the first memory transaction request. The first controller also sends a first peer to peer message. The first peer to peer message includes a first action for the HLD. The first controller triggers the HLD to process the first data according to the first action, such that the HLD generates a plurality of second data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an IHS and a network interface system for transmitting data in an IHS using network service chains. The method includes detecting, via a network interface device controller of a first IHS, a first memory transaction request sent from a second IHS to a first system memory of the first IHS. A plurality of first data associated with the first memory transaction request is received. A first peer to peer message is transmitted to a hardware logic device (HLD). The first peer to peer message includes a first action for the HLD. The controller triggers the HLD to process the first data according to the first action such that the HLD generates a plurality of second data.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
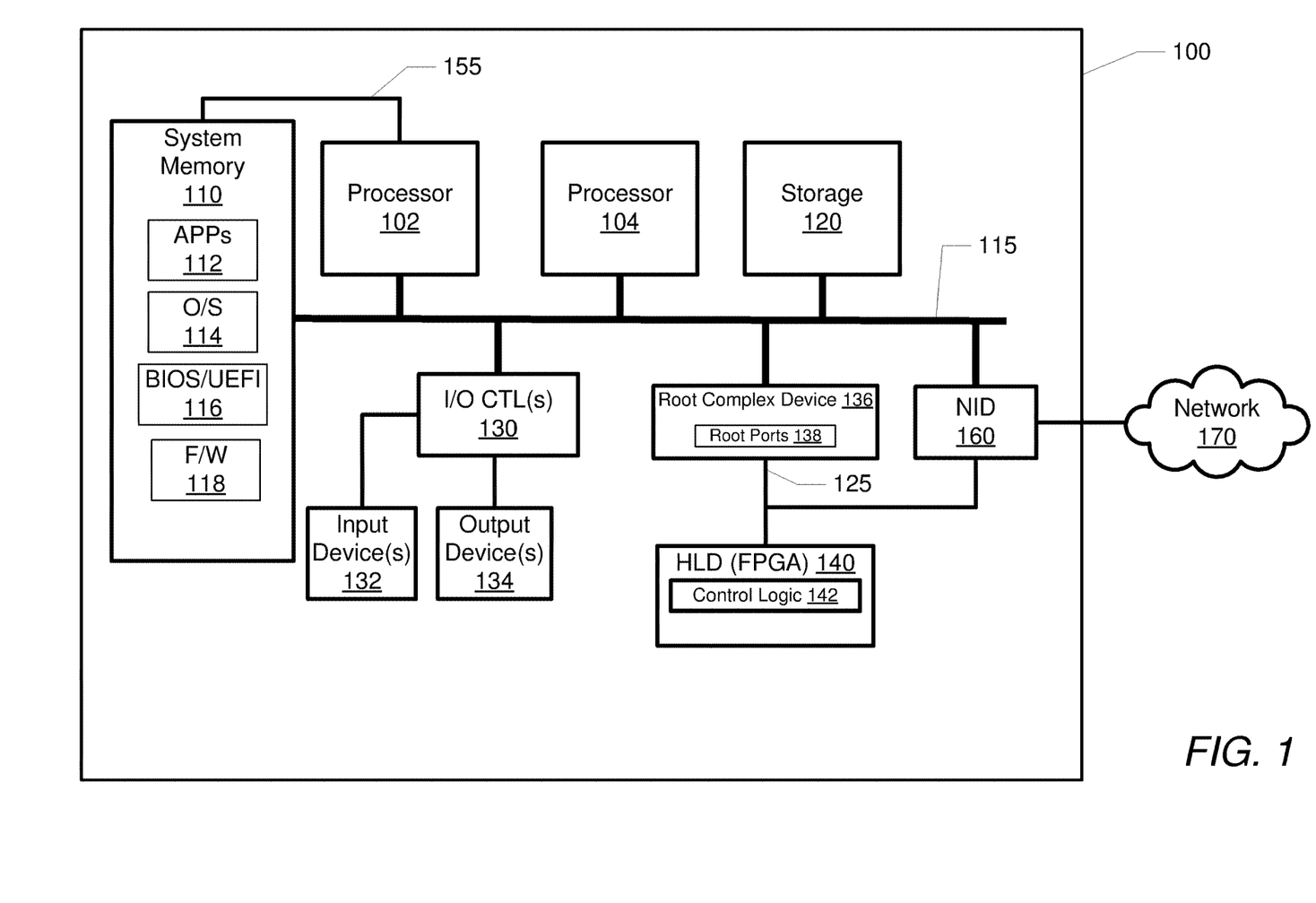
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processors, such as processor 102 and 104. Processors 102 and 104 are coupled to system memory 110 via system interconnect 115. System interconnect 115 can be interchangeably referred to as a system bus, in one or more embodiments. In one embodiment, processor 102 can also be coupled to system memory 110 via a double data rate (DDR) bus 155. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input output system/unified extensible firmware interface (BIOS/UEFI) 116 and firmware (F/W) 118. In one or more embodiments, BIOS/UEFI 116 comprises the additional functionality associated with UEFI and can include UEFI images and drivers. The various software and/or firmware modules have varying functionality when their corresponding program code is executed by processors 102 and/or 104 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further includes a root complex device 136 which is coupled to system interconnect 115. IHS 100 further includes a field programmable gate array (FPGA) 140, which represents one embodiment of hardware logic device (HLD), and is hereafter utilized as the specific example of hardware logic device. Root complex device 136 is also coupled to a HLD, FPGA 140, network interface device (NID) 160 and system memory 110 via peripheral component interconnect express (PCIe) bus 125. While presented as an FPGA in the illustrative embodiments, in another embodiment, the hardware logic device can be an application specific integrated circuit (ASIC). Other types of integrated circuits (IC) can also be implemented as the hardware logic device, in other embodiments.

Root complex device 136 has several root ports, illustrated as root ports 138. Root complex device 136 can support several PCIe root ports 138. Root complex device 136 is a conduit by which other system components communicate with each other by methods defined in the PCIe standard. NID 160 and FPGA 140 can send peer-to-peer messages to each other via root complex device 136. Peer to peer messages are enabled in PCIe communications. In one embodiment, FPGA 140 and processor 102 can also use root complex device 136 to communicate. FPGA 140 includes hardware logic 142 that can perform one of more of the methods described herein.

IHS 100 further comprises NID 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
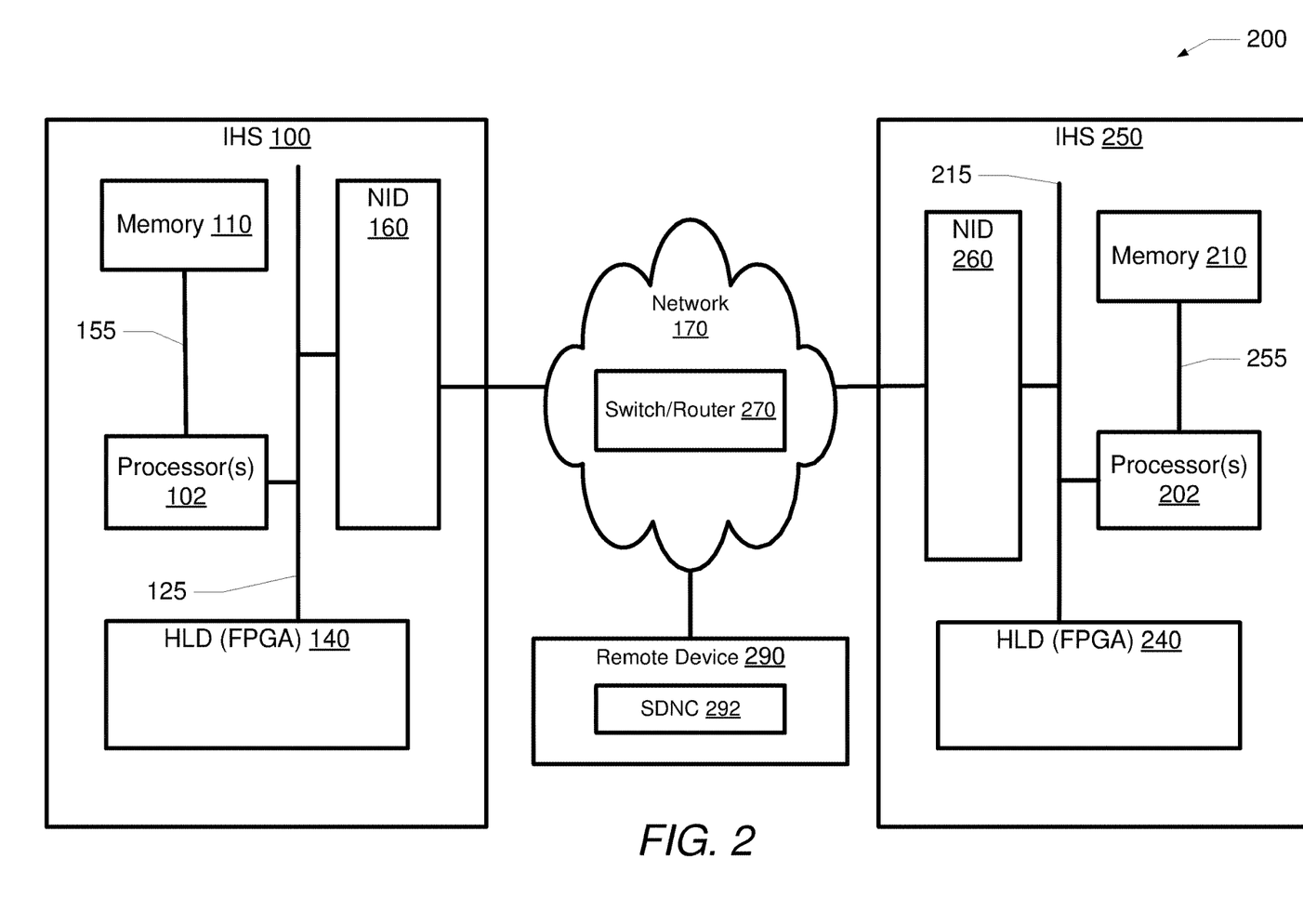
FIG. 2 illustrates an example block diagram of a networked computing system, according to one or more embodiments.

Referring to FIG. 2, one embodiment of a distributed or networked computing system 200 is shown. Networked computing system 200 can also be referred to as a network interface system. In the discussion of FIG. 2 and the following figures, the description of each figure can include general reference to the specific components illustrated within the preceding figures. Networked or distributed computing system 200 includes IHS 100, second IHS 250, network 170 and remote device 290. IHS 100, second IHS 250, and remote device 290 are communicatively coupled to each other via network 170. In one embodiment, remote device 290 can be another IHS. Remote device 290 includes a software defined network controller (SDNC) 292. SDNC 292 is a firmware or software application that executes within a network controller of remote device 290 to manage flow control and enable intelligent networking within networked computing system 200. SDNC 292 can execute on an NID within remote device 290. In one embodiment, SDNC 292 can allow servers to tell switches where to send packets that are formatted units of data. SDNC 292 enables network controllers to determine the path of network packets across a network of switches. The separation of the control plane from the forwarding plane allows for more sophisticated traffic management than is feasible using routing protocols. Network 170 also includes one or more switches/ routers 270 that enable interconnections between the various components of networked or distributed computing system 200.

Second IHS 250 includes one or more processors, such as processor 202 that are coupled to system memory 210 via DDR bus 255. HLD (i.e. FPGA) 240, NID 260 and processor 202 are communicatively coupled via PCIe bus 215. NID 260 is further communicatively coupled to network 170. In IHS 100 and second IHS 250 of FIG. 2, the root complex device is omitted to more clearly show other components. In one embodiment, HLDs 140 and 240 can implement virtual network functions (VNFs). VNFs are tasks that are offloaded by an IHS or processor to another device. For example, a video service running on IHS 100 can make use of on offline or disaggregated accelerator, such as HLD 240 on second IHS 250, to perform video optimization tasks such as scaling, transcoding, or any other operation suited for implementation in an FPGA. The VNFs can be triggered by peer-to-peer rules, programmed by SDNC 292, that specifies that the FPGA is notified by a NID when the transfer, or partial transfer of packets have been completed. The notification can be accomplished by the NID matching information in the packet headers from memory buffers being transferred from one IHS to another.

Figure 3A:
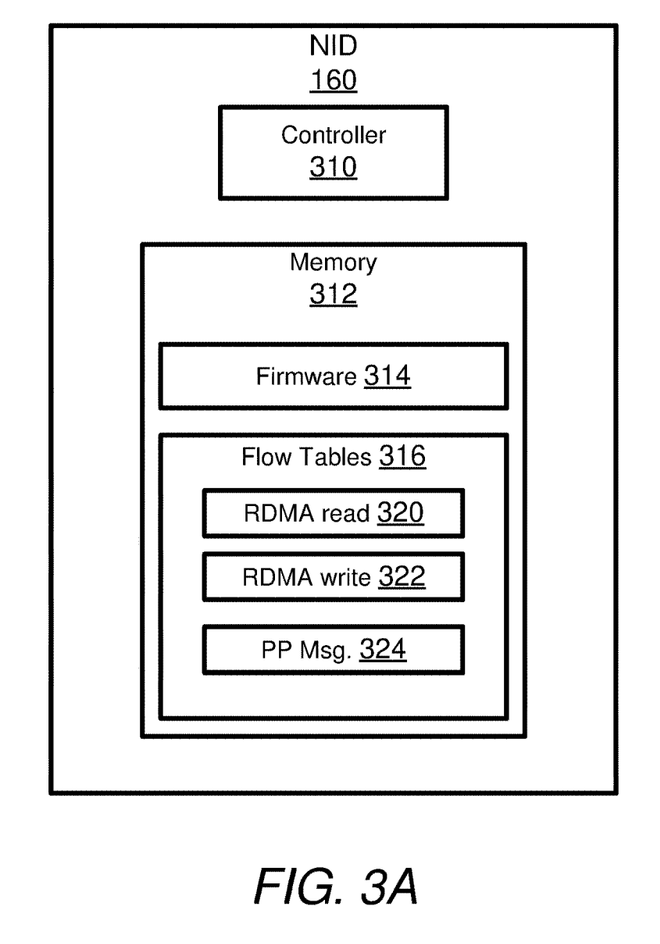
FIG. 3A illustrates a block diagram of a network interface device, according to one or more embodiments.

FIG. 3A illustrates further details of NID 160. NID 160 includes controller 310 and memory 312. Memory 312 can contain firmware 314 and flow tables 316. Controller 310 can execute firmware 314 in order to perform one of more of the methods described herein. NID 160 can receive communication packets from network 170. Flow tables 316 contain information to decide the next hop, destination, or action for a packet. Flow tables 316 contain a set of packet fields that can be matched with packet fields of the received packets, and associated next hop, rules, or actions for matched packets. NID 160 using flow tables 316 can route packets based on the contents of flow tables 316. In one embodiment, flow tables 316 can include a plurality of different types of actions, such as at least one remote direct memory access (RDMA) read action 320, RDMA write action 322, and peer to peer message action 324. When controller 310 receives a packet, controller 310 compares packet fields to determine a match to an entry in flow tables 316 and determines an action based on finding the matching entry in flow tables 316. In an embodiment, flow tables 316 can specify a desired service chain of actions between components of networked computing system 200 (FIG. 2). In one embodiment, flow tables 316 can be received from a software defined network controller and stored in memory 312.

Figure 3B:
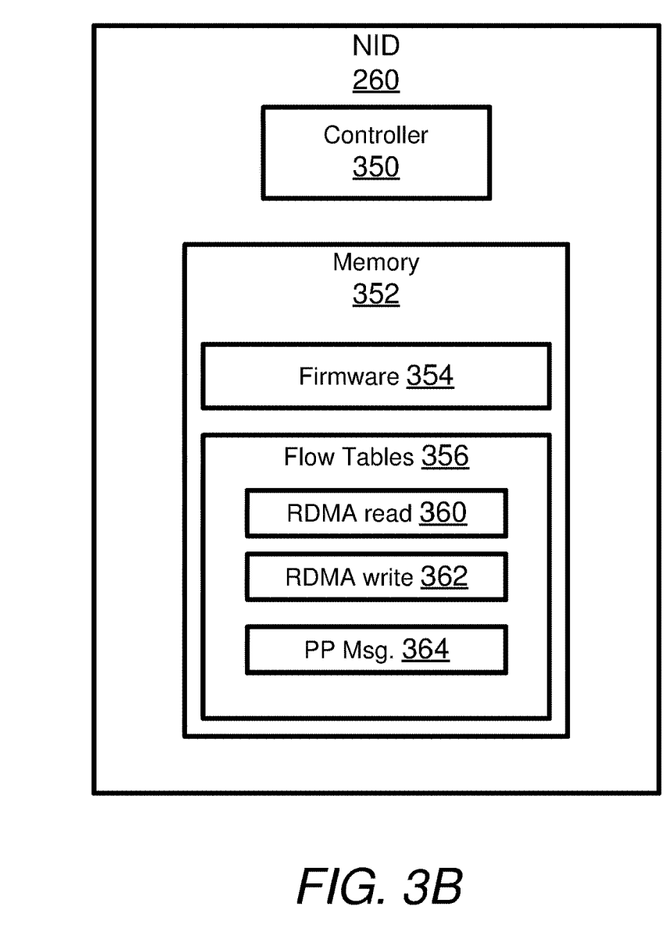
FIG. 3B illustrates a block diagram of another network interface device, according to one or more embodiments.

FIG. 3B illustrates further details of NID 260. NID 260 includes controller 350 and memory 352. Memory 352 can contain firmware 354 and flow tables 356. Controller 350 can execute firmware 354 in order to perform one of more of the methods described herein. NID 260 can receive communication packets from network 170. Flow tables 356 contain information utilized to decide the next hop, destination, or action for a packet. Flow tables 356 contain a set of packet fields that can be matched to packet fields of the received packets, and associated rules or actions for matched packets. NID 260, using flow tables 356, can route packets based on the contents of flow tables 356. In one embodiment, flow tables 356 can include an RDMA read action 360, RDMA write action 362, and peer to peer message action 364. When controller 350 receives a packet, controller 350 matches packet fields and determines an action based on entries in flow tables 356. In an embodiment, flow tables 356 can specify a desired service chain of actions between components of networked computing system 200 (FIG. 2). In one embodiment, flow tables 356 can be received from a software defined network controller and stored in memory 352.

Figure 4A:
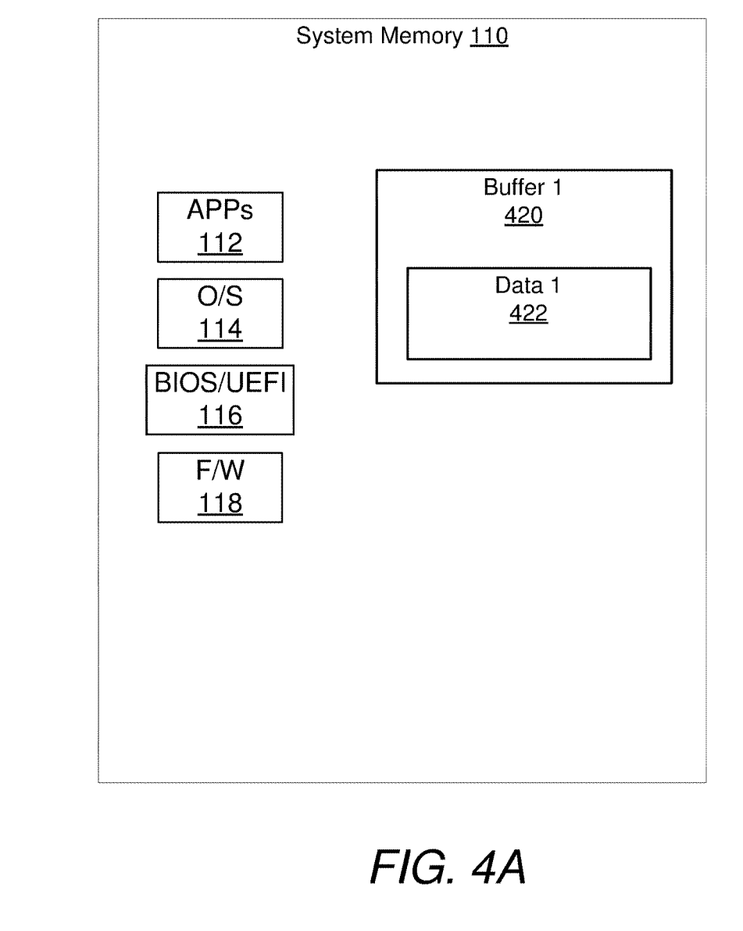
FIG. 4A illustrates example contents of a system memory in an IHS including data that can be read/written by a remote direct memory access utilizing a network interface device controller, according to one or more embodiments.

FIG. 4A illustrates contents of system memory 110 of IHS 100. System memory 110 includes modules, including application(s) 112, O/S 114, BIOS/UEFI 116 and F/W 118. System memory 110 further includes buffer 1 420 that contains data 1 422. Data 1 422 can be any type of data or information. In one embodiment, data 1 422 can be video data or other types of data.

Figure 4B:
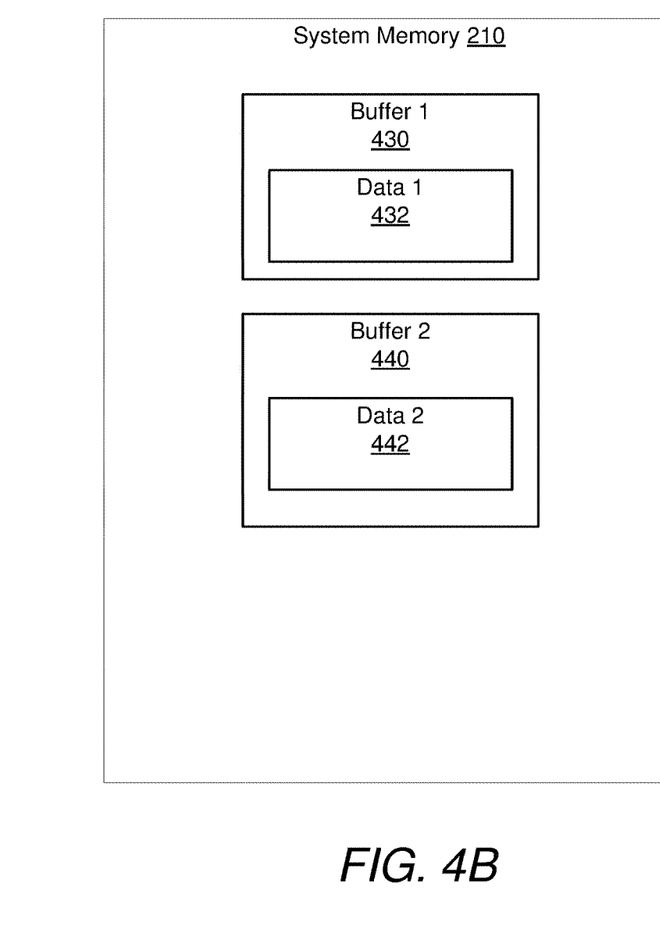
FIG. 4B illustrates example contents of another system memory in another IHS including data that can be read/written by a remote direct memory access utilizing a network interface device controller, according to one or more embodiments.

FIG. 4B illustrates contents of system memory 210 of IHS 250. System memory 210 includes buffer 1 430 that contains data 1 432 and buffer 2 440 that contains data 2 442. Data 2 442 can be any type of data or information. In one embodiment, data 1 432 can be video data or other data received from IHS 100 and data 2 442 can be modified video data that has been modified by HLD 240.

Those of ordinary skill in the art will appreciate that the hardware and software/firmware components and basic configuration depicted in FIGS. 1-4B and described herein may vary. For example, the illustrative components within IHS 100 (FIG. 1) and/or distributed computing system 200 (FIG. 2) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

In one embodiment, IHS 100 can receive a read request for data from a remote device 290. SDNC 292 can discover via network communications that IHS 250 has a HLD 240 for processing of data. IHS 100 transmits an RDMA read request and the data to IHS 250. IHS 250 receives the RDMA read request through NID 260. The RDMA read request is implemented on target IHS 250 and is triggered based on matching packets within flow tables 356. The NID controller 350 causes HLD 240 to process the data according to the peer to peer message action 364 in flow tables 356, and the FPGA then stores the modified data 2 442 to system memory 210. The peer to peer message action occurs after the completion of the RDMA read transfer. The peer to peer message is transmitted between NID 260 and HLD 240 and occurs after the end of the RDMA read transaction based on a special packet sent from NID 160 to NID 260 and matched to flow table contents. A peer to peer message is generated by the NID 160, when the RDMA transaction is complete, to notify the HLD 240 that it can begin processing. The memory address of the peer to peer message action is derived from the RDMA request. NID controller 350 then sends the modified data 2 442 to the remote device 290.

In another embodiment, IHS 100 can send a write request for data to IHS 250. SDNC 292 can discover via network communications that IHS 250 has a HLD 240 for processing of data. IHS 100 transmits an RDMA write request and the data to NID 160. NID 160 receives the RDMA write request from processor 102 and transmits the data (data 1 422) to IHS 250. NID controller 350 receives the data and stores the data as data 1 432 to system memory 210. After the RDMA write transaction is complete, the NID controller 350 generates a peer to peer message 364 and causes HLD 240 to process the data according to the peer to peer message action 364 in flow tables 356. The peer to peer message is transmitted between NID 260 and HLD 240 and occurs after the end of the RDMA write transaction is determined based on a special packet sent from NID 160 to NID 260 and matched to flow table contents. HLD 240 processes the data and stores the modified data 2 442 to system memory 210. The peer to peer message action occurs after the completion of the RDMA transfer. The peer to peer message action is triggered by a message between NID 160 and NID 260. The resulting peer to peer message triggers the processing within HLD 240. The memory address of the peer to peer message action is derived from the RDMA request.

The SDNCs are cognizant of the IHSs connected via network 170 via network communications and specify flow tables to be used by the NIDs. The flow tables implement a desired service chain, some of which can be implemented in HLDs or devices other than processors. The HLDs can implement network functions, without taking up computing cycles of the processors.

Figure 5:
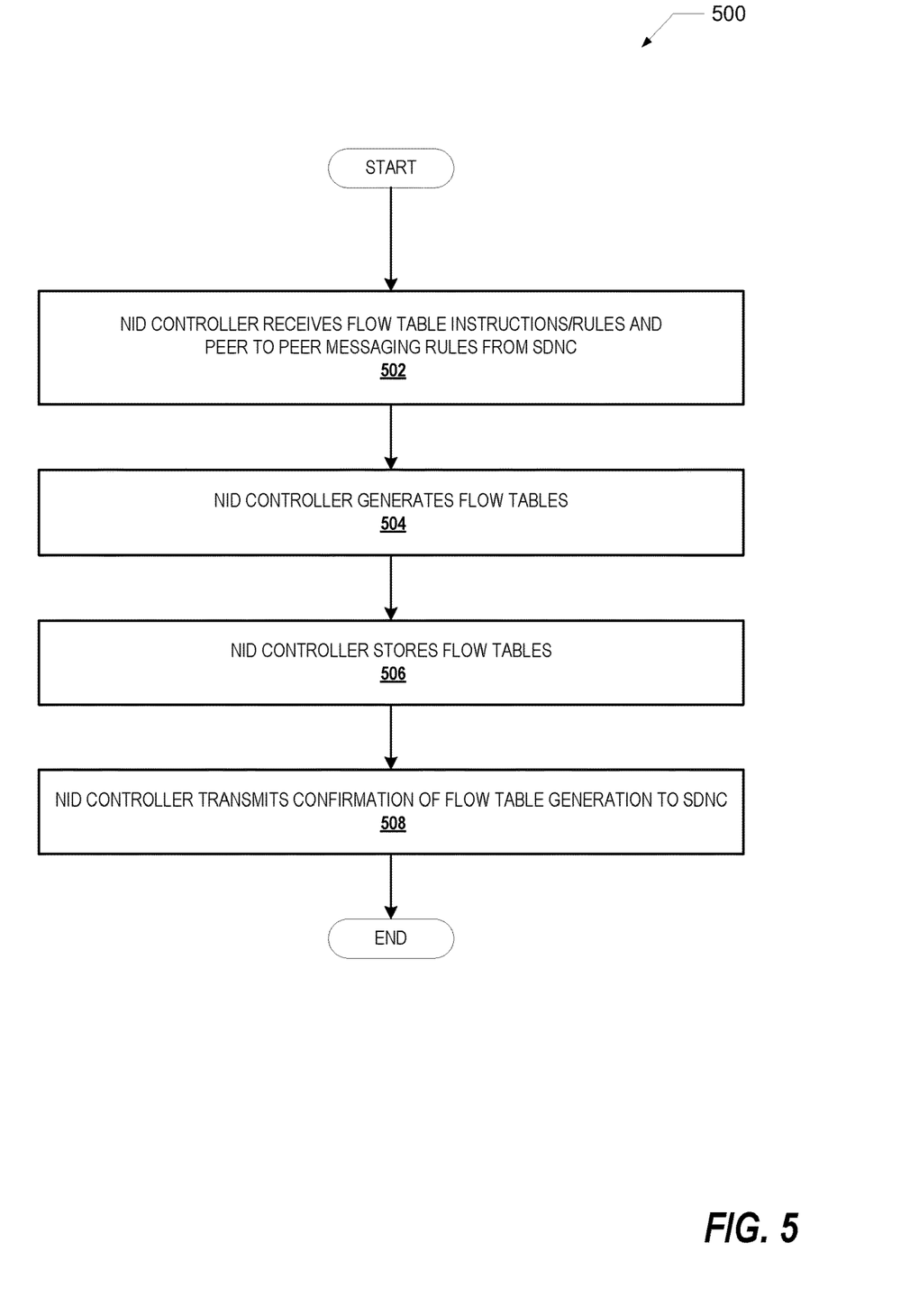
FIG. 5 is a flow chart illustrating one example of a method for generating a flow table in a network interface device, according to one or more embodiments.
Figure 6:
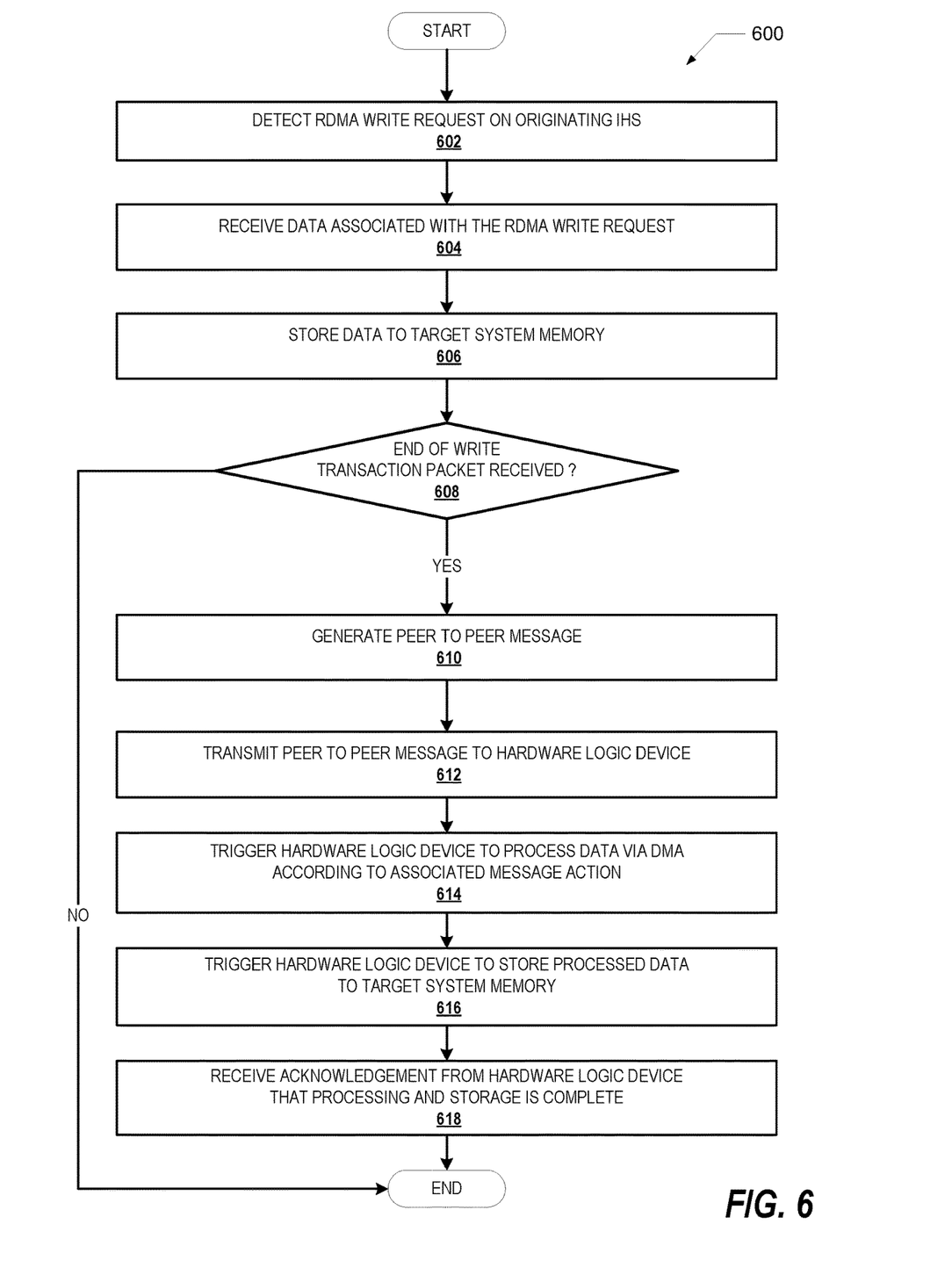
FIG. 6 is a flow chart illustrating one example of a method for performing a remote direct memory access write request in an information handling system, according to one or more embodiments.
Figure 7:
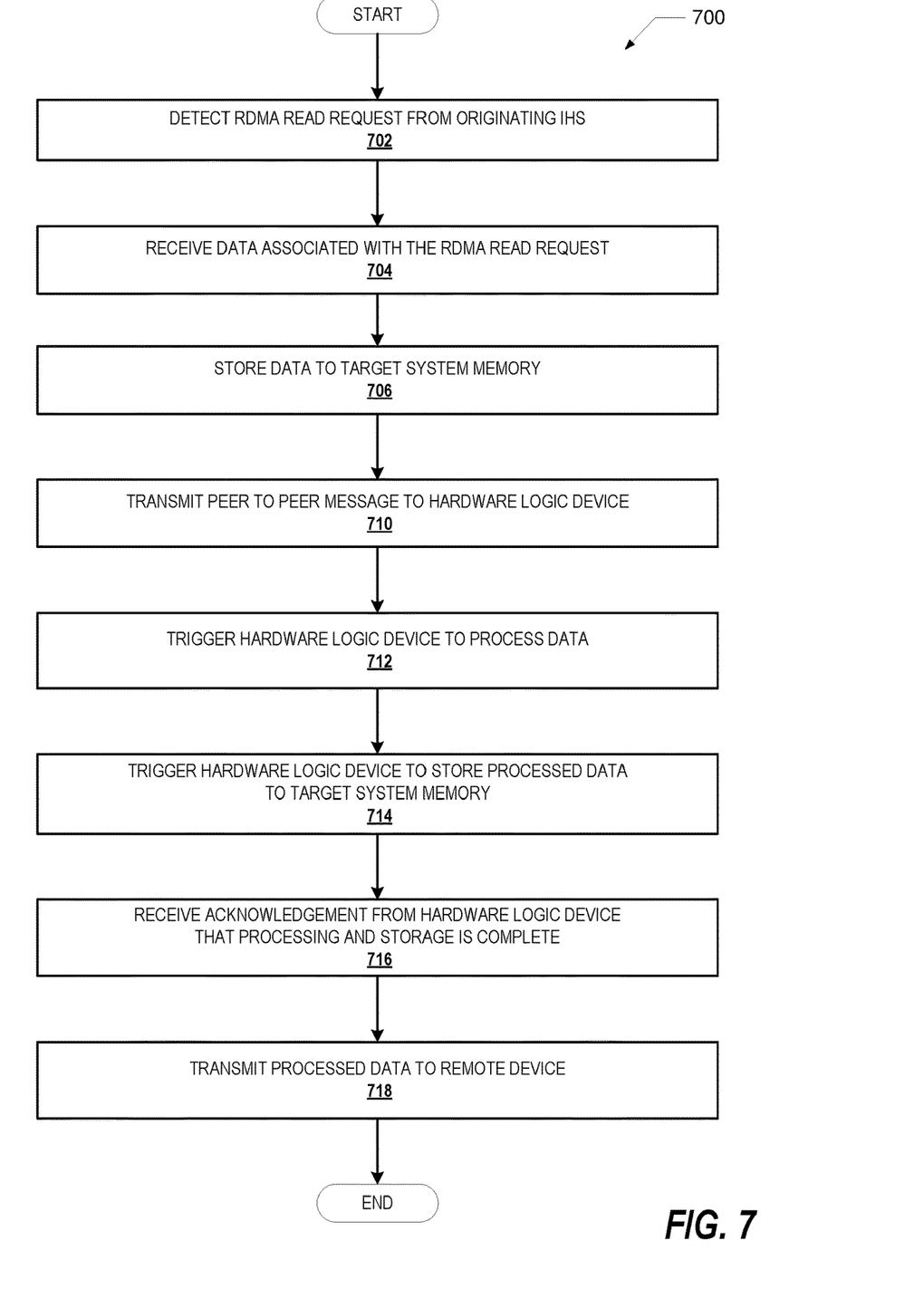
FIG. 7 is a flow chart illustrating one example of a method for performing a remote direct memory access read request in an information handling system, according to one or more embodiments.

FIGS. 5-7 illustrate flowcharts of exemplary methods 500, 600, and 700 by which NID controller 350 within the preceding figures performs different aspects of the processes that enable the one or more embodiments of the disclosure. Generally, method 500 represents a method for generating a flow table in a network interface device. Method 600 represents a method for performing a RDMA write request. Method 700 represents a method for performing a RDMA read request.

The description of methods 500, 600 and 700 is provided with general reference to the specific components illustrated within the preceding FIGS. 1-4B. Generally methods 500, 600 and 700 are described as being implemented via controller 350 and particularly by firmware 354 executing within controller 350. It is however appreciated that certain aspects of the described methods may be implemented via other processing devices and/or execution of other code.

Referring now to the flow chart of FIG. 5, method 500 begins at the start block and proceeds to block 502 where controller 350 receives flow table instructions/rules and peer to peer messaging rules from SDNC 292 via network 170. Controller 350 generates flow tables 356 based on the received flow table instructions/rules and peer to peer messaging rules (block 504) and stores the flow tables to memory 352 (block 506). Controller 350 transmits a confirmation of the generation of flow tables 356 to SDNC 292 (block 508). Method 500 then terminates.

With reference to the flow chart of FIG. 6, method 600 begins at the start block and proceeds to block 602 where controller 310 detects a RDMA write request within packets of the originating IHS 100 (i.e. processor 102) via PCIe bus 125. The RDMA write is triggered based on a matching field within the packets of the RDMA write request 322 in flow table 316. Controller 350 receives data 422 from the RDMA transaction from IHS 100 (block 604) and stores the data to system memory 210 as data 1 432 (block 606). Controller 350 determines if a special end of write transaction packet has been received from IHS 100 to signal the end of the write transaction (decision block 608). In response to an end of write transaction packet not being received, method 600 ends. In response to the end of write transaction packet being received, controller 350 generates a peer to peer message 364 based on a flow rule (block 610). The peer to peer message 364 is a message between NID 260 and HLD 240, which is an action triggered by a flow table match to the end of the RDMA write transaction.

Controller 350 sends the peer-to-peer message to HLD 240 (block 612) and triggers HLD 240 to process data 1 432 according to the action associated with the received peer to peer message (block 614). HLD 240 has access to data 1 432 through a regular direct memory access (DMA) transaction via PCIe bus 215 and can obtain the destination memory address from the peer-peer message. Controller 350 triggers HLD 240 to store the processed data to system memory 210 as data 2 442 (block 616), and controller 350 receives an acknowledgement signal from HLD 240 that processing and storage of data 2 442 is complete (block 618). Method 600 then terminates.

With reference to the flow chart of FIG. 7, method 700 begins at the start block and proceeds to block 702 where controller 350 detects a RDMA read request 360 within packets received from the originating IHS 100 via network 170. The RDMA read request is triggered based on performing a comparison that matches at least one field within the received packets to the RDMA read request 360 in flow table 356. The received packets include a destination address of a remote device 290 that has requested data from IHS 100. Controller 350 receives data 1 422 associated with the RDMA read request from IHS 100 (block 704) and stores the data to system memory 210 as data 1 432 (block 706).

Controller 350 transmits to or notifies HLD 240 with a peer-to-peer message (i.e. peer to peer message 364) when it completes the RDMA read (block 710) and triggers HLD 240 to process data 1 432 according to the action associated with the received peer to peer message (block 712). Controller 350 triggers HLD 240 to store the processed data to system memory 210 as data 2 442 (block 714) and receives an acknowledgement from HLD 240 that processing and storage of data 2 442 is complete (block 716). Controller 350 transmits the data 2 442 to a remote device 290 (block 718). Method 700 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of transmitting data in a networked information handling system (IHS), the method comprising:
   detecting, via a controller within a network interface device (NID) of a first IHS, a first memory transaction request sent from a second IHS to a first system memory of the first IHS, the second IHS communicatively coupled to the NID of the first IHS;
   receiving, at the controller, first data associated with the first memory transaction request;
   comparing packet fields from received communication packets with packet fields contained in a flow table stored in a memory of the NID to determine a match of the received packet fields to an entry in the flow table, wherein: the flow table comprises:
      information to decide a next hop, destination, or action for a packet;
      a set of packet fields that can be matched with packet fields of the received packets; and
      associated next hop, rules, or actions for matched packets; and
      the NID routes packets based on contents of the flow table;
   determining a first action to perform with the first data, based on finding a matching entry in the flow table, wherein the flow table specifies a desired service chain of actions between components of a networked computing system;
   transmitting, by the controller via a root complex device, a first peer to peer message from the controller to a hardware logic device (HLD), the first peer to peer message including the first action for the HLD, the root complex device being a conduit for communication among components of the first IHS and enabling peer to peer messages between the components; and
   triggering, via the first peer to peer message, the HLD to process the first data according to the first action such that the HLD generates a plurality of second data.

2. The method of claim 1, wherein the first memory transaction request is a RDMA write request, and the method further comprises:
   storing the first data to the first system memory;
   determining if an end of write transaction packet has been received;
   in response to the end of write transaction packet being received, generating the peer to peer message; and
   receiving an acknowledgement from the HLD that processing of the first data has completed.

3. The method of claim 1, wherein the first memory transaction request is a RDMA read request, and the method further comprises:
   storing the first data to the first system memory;
   receiving an acknowledgement from the HLD that processing of the first data has completed; and
   transmitting the second data to a remote device.

4. The method of claim 1, wherein the flow table comprises a plurality of different types of actions comprising at least one of a RDMA read request, a RDMA write request, and at least one peer to peer message.

5. The method of claim 1, further comprising generating the flow table prior to the detecting of the first memory transaction request by:
   receiving instructions associated with the flow table from a software defined networking controller, the instructions comprising flow table rules and peer to peer messaging rules;
   generating the flow table based on the received instructions; and
   storing the flow table to a memory of the first network interface device.

6. An information handling system (IHS) comprising: a processor communicatively coupled to a first system memory;
   a hardware logic device (HLD) communicatively coupled to the first system memory; a first network interface device (NID) communicatively coupled to the processor, the first system memory and the HLD, the first network interface device including a first controller having firmware executing thereon that causes the first controller to:
   detect a first memory transaction request received from a second IHS for the first system memory, the second IHS communicatively coupled to the NID of the first IHS:
   receive first data associated with the first memory transaction request; and
   compare packet fields from received communication packets with packet fields contained in a flow table stored in a memory of the NID to determine a match of the received packet fields to an entry in the flow table, wherein: the flow table comprises:
      information to decide a next hop, destination, or action for a packet;
      a set of packet fields that can be matched with packet fields of the received packets; and
      associated next hop, rules, or actions for matched packets; and
      the NID routes packets based on contents of the flow table;
   determine a first action to perform with the first data, based on finding a matching entry in the flow table wherein the flow table specifies a desired service chain of actions between components of a networked computing system;
   transmit, via a root complex device, a first peer to peer message to the HLD, the first peer to peer message including the first action for the HLD, the root complex device being a conduit for communication among components of the first IHS and enabling peer to peer messages between the components; and trigger, via the first peer to peer message, the HLD to process the first data according to the first action such that the HLD generates a plurality of second data.

7. The information handling system of claim 6, wherein the first memory transaction request is a RDMA write request, the firmware further configuring the controller to:
   store the first data to the first system memory;
   determine if an end of write transaction packet has been received;
   in response to the end of write transaction packet being received, generate the peer to peer message; and
   receive an acknowledgement from the HLD that processing of the first data has completed.

8. The information handling system of claim 6, wherein the first memory transaction request is a RDMA read request, the firmware further configuring the controller to:
   store the first data to the first system memory;
   receive an acknowledgement from the HLD that processing of the first data has completed; and
   transmit the second data to a remote device.

9. The information handling system of claim 6, wherein the flow table comprises a plurality of different types of actions comprising at least one of a RDMA read request, a RDMA write request^ and at least one peer to peer message.

10. The information handling system of claim 6, wherein the firmware further configures the controller to generate the flow table prior to the detecting of the first memory transaction request, wherein the controller:
   receives instructions associated with the flow table from a software defined networking controller, the instructions comprising flow table rules and peer to peer messaging rules;
   generates the flow table based on the received instructions; and
   stores the flow table to a memory of the first network interface device.

11. The information handling system of claim 6, wherein the HLD is a separate physical component communicatively coupled via a peripheral component interconnect express (PCIe) bus to the NID and to a processor and the first system memory of the first UTS via the root complex device.

12. A network interface system comprising:
   a first IHS comprising a first network interface device (NID) communicatively coupled to a first system memory and a hardware logic device (HLD) communicatively coupled to the first system memory and the first network interface device;
   a second IHS communicatively coupled to the first NID of the first IHS;
   the first network interface device including a first controller having firmware executing thereon that facilitates data transmission, wherein the firmware configures the first controller to:
   detect a first memory transaction request received from the second IHS for the first system memory;
   receive first data associated with the first memory transaction request;
   compare packet fields from received communication packets with packet fields contained in a flow table stored in a memory of the NIP to determine a match of the received packet fields to an entry in the flow table, wherein: the flow table comprises:
      information to decide a next hop, destination, or action for a packet;
      a set of packet fields that can be matched with packet fields of the received packets; and
      associated next hop, rules, or actions for matched packets; and
      the NID routes packets based on contents of the flow table;
   determine a first action to perform with the first data, based on finding a matching entry in the flow table, wherein the flow table specifies a desired service chain of actions between components of a networked computing system;
   transmit, via a root complex device, a first peer to peer message to the HLD, the first peer to peer message including the first action for the HLD, the root complex device being a conduit for communication among components of the first IHS and enabling peer to peer messages between the components; and
   trigger, via the first peer to peer message, the HLD to process the first data according to the first action such that the HLD generates a plurality of second data.

13. The network interface system of claim 12, wherein the first memory transaction request is a RDMA write request, the firmware further configuring the first controller to:
   store the first data to the first system memory;
   determine if an end of write transaction packet has been received;
   in response to the end of write transaction packet being received, generate the peer to peer message; and
   receive an acknowledgement from the HLD that processing of the first data has completed.

14. The network interface system of claim 12, wherein the first memory transaction request is a RDMA read request, the firmware further configuring the first controller to:
   store the first data to the first system memory;
   receive an acknowledgement from the HLD that processing of the first data has completed; and
   transmit the second data to a remote device.

15. The network interface system of claim 12, wherein the flow table comprises a plurality of different types of actions comprising at least one of a RDMA read request, a RDMA write request^ and at least one peer to peer message.

16. The network interface system of claim 12, wherein the firmware further configures the controller to generate the flow table prior to the detecting of the first memory transaction request, wherein the controller:
   receives instructions associated with the flow table from a software defined networking controller, the instructions comprising flow table rules and peer to peer messaging rules;
   generates the flow table based on the received instructions; and
   stores the flow table to a memory of the first network interface device.

* * * * *